(12) United States Patent
Hannbeck Von Hanwehr et al.

(10) Patent No.: US 7,055,514 B2
(45) Date of Patent: Jun. 6, 2006

(54) ENGINE CONTROLLER AND ASSOCIATED OPERATING METHOD

(75) Inventors: Rainer Hannbeck Von Hanwehr, Regensburg (DE); Hans-Dieter Heidenfelder, Waiblingen (DE)

(73) Assignee: DaimlerChrysler AG, Stuttgart (DE)

( * ) Notice: Subject to any disclaimer, the term of this patent is extended or adjusted under 35 U.S.C. 154(b) by 162 days.

(21) Appl. No.: 10/787,254

(22) Filed: Feb. 27, 2004

(65) Prior Publication Data

US 2004/0230365 A1 Nov. 18, 2004

(30) Foreign Application Priority Data

Feb. 27, 2003 (DE) ................ 103 08 650

(51) Int. Cl.
*F02D 41/14* (2006.01)

(52) U.S. Cl. ............... 123/698; 123/295; 123/674; 123/519

(58) Field of Classification Search ............... 123/295, 123/698, 674, 518, 519
See application file for complete search history.

(56) References Cited

U.S. PATENT DOCUMENTS

| | | | | |
|---|---|---|---|---|
| 4,831,992 A | | 5/1989 | Jundt et al. ............ | 123/520 |
| 5,186,153 A | * | 2/1993 | Steinbrenner et al. ...... | 123/519 |
| 5,245,975 A | * | 9/1993 | Ito ........................ | 123/520 |
| 6,148,802 A | * | 11/2000 | Moser et al. ............ | 123/518 |
| 6,293,260 B1 | * | 9/2001 | Atanasyan ............... | 123/520 |
| 2003/0106522 A1 | * | 6/2003 | Esteghlal ............... | 123/295 |
| 2003/0221660 A1 | * | 12/2003 | Sumilla et al. ........... | 123/295 |
| 2004/0162666 A1 | * | 8/2004 | Bidner et al. ............ | 701/109 |

FOREIGN PATENT DOCUMENTS

| DE | 3639946 | 1/1997 |
|---|---|---|
| DE | 19926310 | 12/2000 |
| DE | 19936202 | 2/2001 |

* cited by examiner

*Primary Examiner*—Erick Solis
(74) *Attorney, Agent, or Firm*—Crowell & Moring LLP

(57) ABSTRACT

Operating method and apparatus for operating an engine controller for an internal combustion engine, including operating in a first operating mode, acquiring at least one state variable (CL, Adap_Fenst_fac, Adap_Fenst_Add) of the internal combustion engine and changing over from the first operating mode into a second operating mode. The changeover from the first operating mode into the second operating mode take place as a function of the determined state variable (CL, Adap_Fenst_fac, Adap_Fenst_Add) of the internal combustion engine.

17 Claims, 7 Drawing Sheets

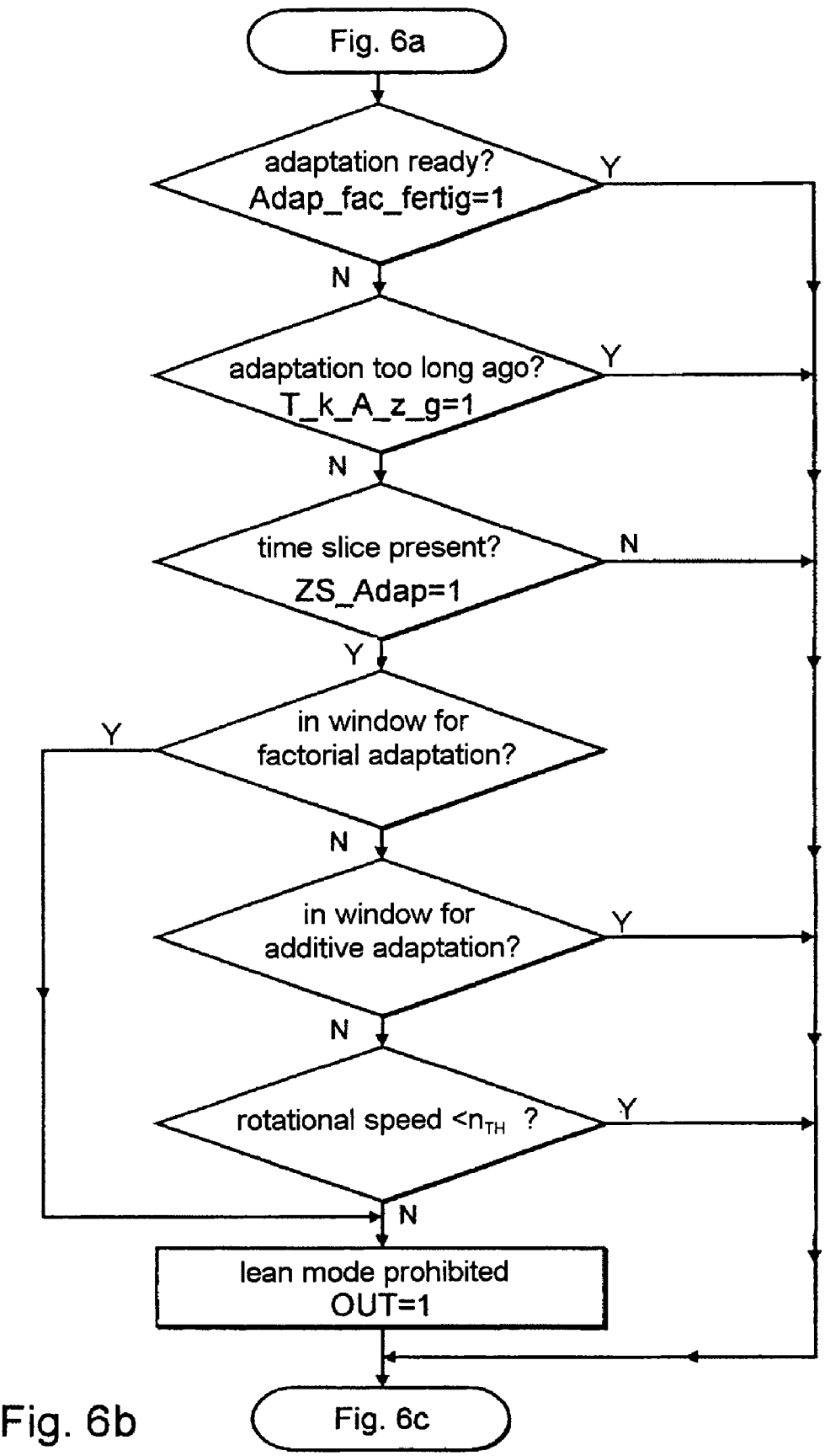

ENGINE CONTROLLER AND ASSOCIATED OPERATING METHOD

BACKGROUND AND SUMMARY OF THE INVENTION

This application claims the priority of German application DE 103 08 650.1, filed 27 Feb. 2003, which is expressly incorporated by reference herein.

The invention relates to an operating method for operating an engine controller and to a corresponding engine controller.

Modern spark ignition engines generally have a three-way catalytic converter for purifying the exhaust gases. The fuel/air ratio in the exhaust gas is regulated to a value of approximately $\lambda \approx 1$ by means of a lambda probe arranged in the stream of exhaust gases, in order to bring about an optimum purification effect of the three-way catalytic converter for the various components of the exhaust gases.

In spark ignition engines, fuel tank venting devices are also known in which the fuel which is vaporizing in the fuel container is taken up by an activated carbon filter and buffered. This buffering of the vaporizing fuel in an activated carbon filter advantageously prevents fuel vaporizations from being able to contaminate the surrounding air. However, the absorptive capacity of such activated carbon filters is limited so that, when a predefined degree of loading is reached, the activated carbon filter is purged with fresh air and the stored fuel passes into the intake tract of the spark ignition engine and is subsequently burnt. During this purging of the activated carbon filter, the spark ignition engine changes over temporarily from the normal operating mode of a regulated lambda value into a different operating mode in which the fuel/air ratio can deviate from the setpoint value. In the known spark ignition engines, this changeover of the operating mode takes place at predefined time intervals so that the absorptive capacity of the activated carbon filter is not exceeded.

However, it is a disadvantage of this timed changeover of the operating mode that the quantity of vaporizing fuel also depends on other variables, such as, for example, the fuel temperature and fuel pressure. The timed changeover of the operating mode therefore leads to unsatisfactory results.

The invention is therefore based on the object of providing an engine controller and a corresponding operating method in which the changeover between the operating modes takes place as far as possible according to certain requirements.

The invention comprises the general technical teaching of performing the changeover of the operating mode as a function of at least one state variable of the internal combustion engine.

In one variant of the invention, the operating method according to the invention controls the switchover from the normal mode or lean mode of a spark ignition engine into a fuel tank venting mode in which an activated carbon filter is regenerated, in order to avoid exceeding the storage capacity of the activated carbon filter.

In this variant of the invention, the changeover of the operating mode can be controlled as a function of the degree of loading of the activated carbon filter. Here, the engine controller preferably changes into the fuel tank venting mode if the degree of loading of the activated carbon filter exceeds a predefined limiting value.

The degree of loading of the activated carbon filter is preferably determined by changing over into the fuel tank venting mode in a timed fashion, the activated carbon filter being purged with fresh air and as a result regenerated. The vaporizations of fuel, which are purged from the activated carbon filter, depending on the degree of loading of the activated carbon filter, cause the fuel/air mixture to be enriched, which is sensed by means of a lambda probe. The change in the fuel/air ratio during the regeneration of the activated carbon filter therefore permits the degree of loading of the activated carbon filter to be determined.

However, in this variant of the invention, pressure and/or temperature in the fuel container can also be evaluated in order to control the changeover into the fuel tank venting mode. As a result, the vaporizations of fuel in the fuel container lead not only to a rise in the degree of loading of the activated carbon filter but also to a rise in pressure in the fuel container, which permits conclusions to be drawn about the degree of loading of the activated carbon filter. The fuel temperature is also preferably evaluated as the vaporizations of fuel in the fuel container increase with the fuel temperature.

In another variant of the invention, the changeover from the normal mode or lean mode of the internal combustion engine into an operating mode in which the fuel/air ratio is adapted is controlled. In modern spark ignition engines with an exhaust gas catalytic converter, the fuel/air ratio is regulated because the purification effect of exhaust gas catalytic converters depends on the fuel/air ratio, and is also satisfactory only within a highly limited value range (referred to as the catalytic converter window) of the fuel/air ratio for the different exhaust gas components comprising hydrocarbon, nitrogen oxide and carbon monoxide. However, the regulating dynamics during the regulation of the fuel/air ratio decline in proportion to the magnitude of the error to be eliminated, with the result that the regulation of the fuel/air ratio is usually combined with a pilot control. The pilot control predefines a fuel/air ratio as a working point for the regulation of the fuel/air ratio, with the result that the regulator then only has to eliminate small errors, and therefore has good regulating dynamics. The adaptation of the fuel/air ratio has the function of setting the pilot control in such a way that, as far as possible, minimum errors are required to be eliminated at the working point of the regulator in order to achieve regulating dynamics which are as good as possible.

The changeover from the normal mode or lean mode of the internal combustion engine into the adaptation mode is preferably controlled here as a function of one or more state variables of the internal combustion engine. For example, the rotational speed of the internal combustion engine, the torque of the internal combustion engine and/or the time period since the last adaptation can be taken into account in order to control the changeover of the operating mode according to requirements.

In one preferred embodiment, an additive adaptation or a factorial or multiplicative adaptation of the fuel/air ratio is possible in the adaptation mode. The additive adaptation takes place by adding or subtracting a specific offset value to or from the working point of the pilot control system in order to optimize the working point. In contrast, in the case of factorial or multiplicative adaptation, multiplication by a specific adaptation factor is carried out in order to optimize the working point. One of these two operating modes must be selected at the changeover into the adaptation mode with the rotational speed and the torque of the internal combustion engine being preferably taken into account. A factorial adaptation is then carried out within a specific rotational speed/torque window, while an additive adaptation is carried out within another rotational speed/torque window. The changeover into the factorial adaptation mode or into the additive adaptation mode is therefore controlled as a function of the rotational speed and the torque of the internal combustion engine.

The factorial adaptation is preferably carried out if the torque and the rotational speed exceed predefined eliminating values, while the additive adaptation is carried out if the torque and the rotational speed drop below predefined limiting values.

The invention is not restricted to controlling a spark ignition engine but rather can also be applied in a diesel engine which has various operating modes.

Other advantageous developments of the invention are contained in the subclaims or are explained below together with the description of the preferred exemplary embodiment of the invention with reference to the drawings, in which:

BRIEF DESCRIPTION OF THE DRAWINGS

FIGS. 6a to 6c show the operating method of the control unit from FIG. 1 as a flowchart.

DETAILED DESCRIPTION OF THE PREFERRED EMBODIMENT

Figure 1:
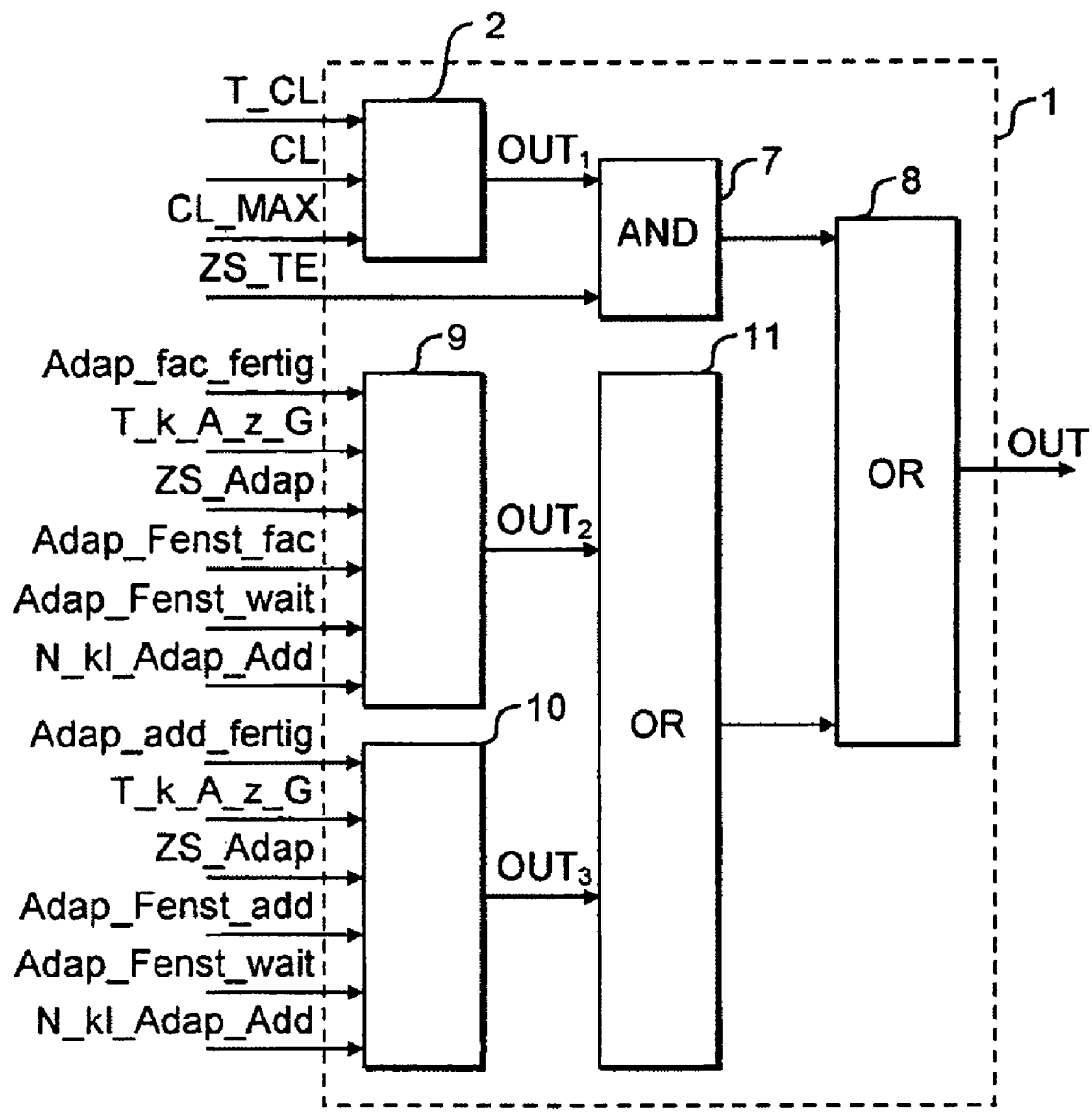
FIG. 1 shows a control unit according to the invention for deactivating the lean mode in a spark ignition engine.

The block circuit diagram in FIG. 1 shows a control unit 1 according to the invention, which is used in an electronic engine controller for a spark ignition engine in order to disable a lean mode of the spark ignition engine if the spark ignition engine is to change over into another operating mode. The control unit 1 therefore has a binary signal output for disabling or respectively enabling the lean mode, a control signal OUT being output at said signal output and the control signal OUT assuming a high level to disable the lean mode and a low level to enable the lean mode.

The lean mode is disabled, for example, if an activated carbon filter has to be regenerated in the fuel tank venting operation. For this purpose, the control unit 1 has an evaluation unit 2 which is illustrated in detail in FIG. 2 and picks up, at the input end, a previously determined degree of loading CL of the activated carbon filter and a measured time period T_CL since the last regeneration of the activated carbon filter. Furthermore, the evaluation unit 2 also receives, as input variable, an upper limiting value CL_MAX for the degree of loading CL of the activated carbon filter. At the output end, the evaluation unit 2 generates a binary control signal $OUT_1$ which indicates, when there is a high level, that the activated carbon filter should be regenerated, whereas a low level of the control signal $OUT_1$ indicates that there is no present need to regenerate the activated carbon filter.

Figure 2:
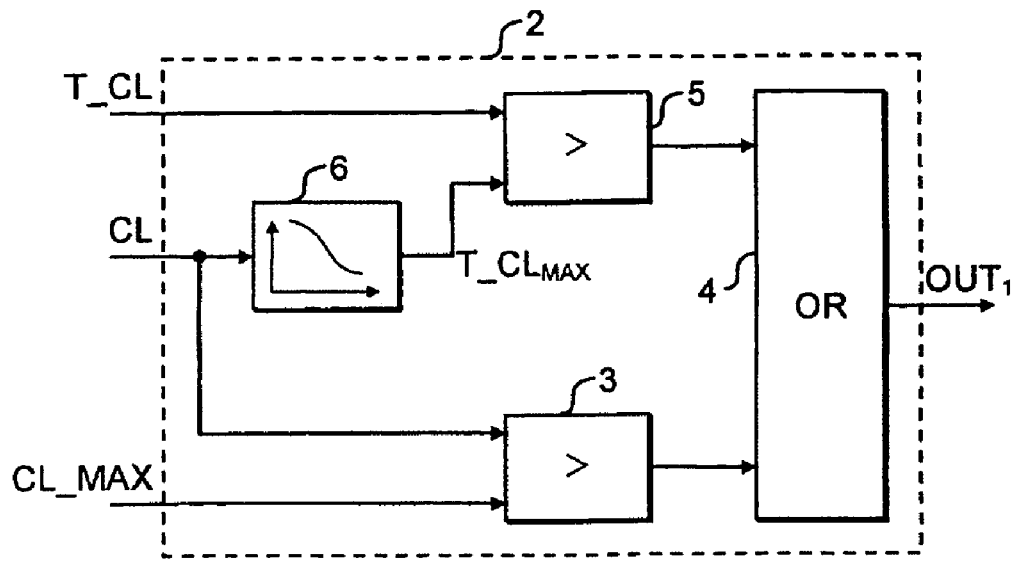
FIG. 2 shows an evaluation unit of the control unit from FIG. 1 for deactivating the lean mode for a fuel tank venting operation.
Figure 6A:
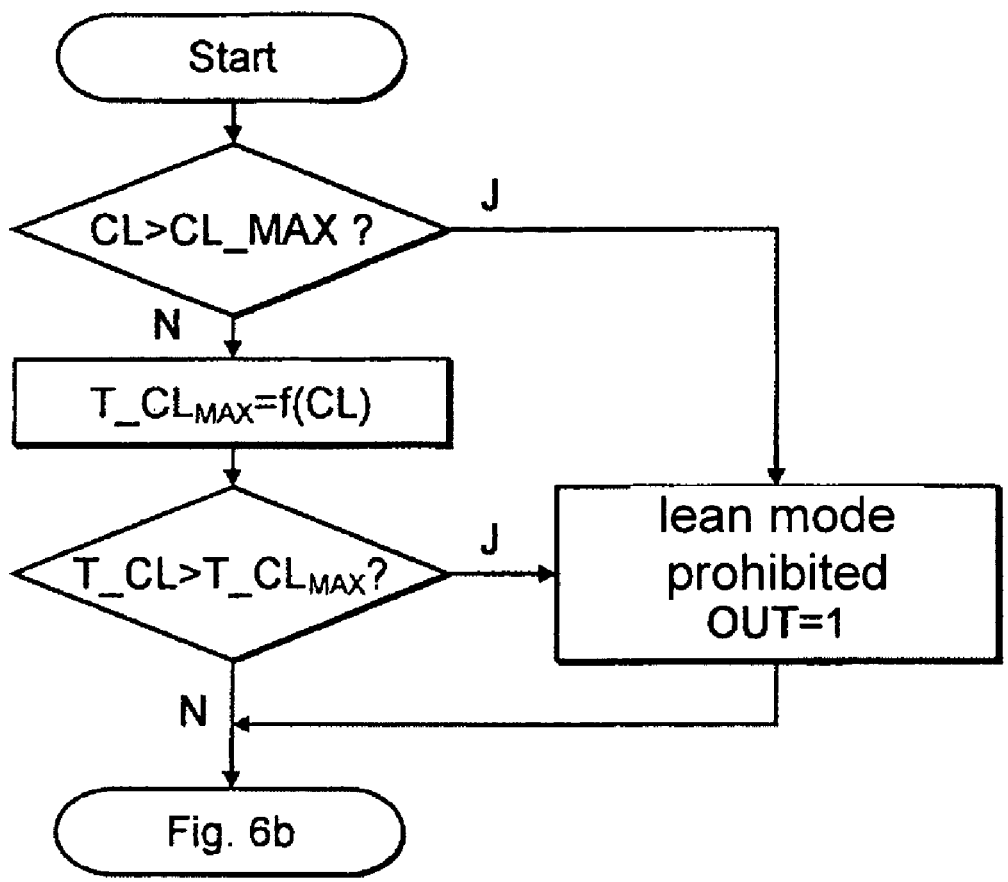

The design and method of operation of the evaluation unit 2 will now be described below with reference to the block circuit diagram illustrated in FIG. 2, and the flowchart represented in FIG. 6a.

In order to check the degree of loading CL of the activated carbon filter, the evaluation unit 2 has a comparator unit 3 which compares the degree of loading CL with the predefined limiting value CL_MAX, and when the limiting value CL_MAX is exceeded, passes on a high level to a downstream OR element 4 so that the control signal $OUT_1$ at the output of the evaluation unit 2 also assumes a high level.

Furthermore, the evaluation unit 2 has a further comparator unit 5 in order to compare the time period T_CL since the last measurement of the degree of loading CL with an upper limiting value $T\_CL_{MAX}$, the limiting value $T\_CL_{MAX}$ being defined as a function of the degree of loading CL, by means of a characteristic curve element 6. If the time period T_CL since the last measurement of the degree of loading CL exceeds the limiting value $T\_CL_{MAX}$, the comparator unit 5 outputs a high level to the OR element 4 so that the control signal $OUT_1$ at the output of the evaluation unit 2 also assumes a high level.

However, the disabling of the lean mode for the regeneration of the activated carbon filter is carried out in a timed fashion by means of a binary time slice signal ZS_TE which permits the regeneration of the activated carbon filter when there is a high level, and disables said regeneration when there is a low level. The control unit 1 therefore has an AND element 7 which is connected at the input end to the evaluation unit 2 and to the time slice signal ZS_TE so that the control signal $OUT_1$ of the evaluation unit is passed on only when there is a high level of the time slice signal ZS_TE, and is otherwise disabled.

At the output end, the AND element 7 is connected to the signal output of the control unit 1 via an OR element 8 so that the control unit 1 disables the lean mode if the degree of loading CL is too large, or has no longer been determined for too long a time.

Furthermore, the control unit 1 disables the lean mode even if the fuel/air ratio of the spark ignition engine is to be adapted. In modern spark ignition engines with an exhaust gas catalytic converter, the fuel/air ratio is thus regulated as the purification effect of exhaust gas catalytic converters depends on the fuel/air ratio, and is also satisfactory only within a highly limited value range (referred to as the catalytic converter window) of the fuel/air ratio for the different exhaust gas components comprising hydrocarbon, nitrogen oxide and carbon monoxide. However, the regulating dynamics during the regulation of the fuel/air ratio decline in proportion to the magnitude of the error to be eliminated with the result that the regulation of the fuel/air ratio is usually combined with a pilot control. The pilot control here predefines a fuel/air ratio as a working point for the regulation of the fuel/air ratio, with the result that the regulator then only has to eliminate small errors, and therefore has good regulating dynamics. The adaptation of the fuel/air ratio has here the function of setting the pilot control in such a way that as far as possible minimum errors have to be eliminated at the working point of the regulator in order to achieve regulating dynamics which are as good as possible.

The control unit 1 permits here either an additive or factorial or multiplicative adaptation of the fuel/air ratio as a function of the operating state of the spark ignition engine, the lean mode being disabled both during the additive adaptation mode and during the factorial adaptation mode.

Figure 3:
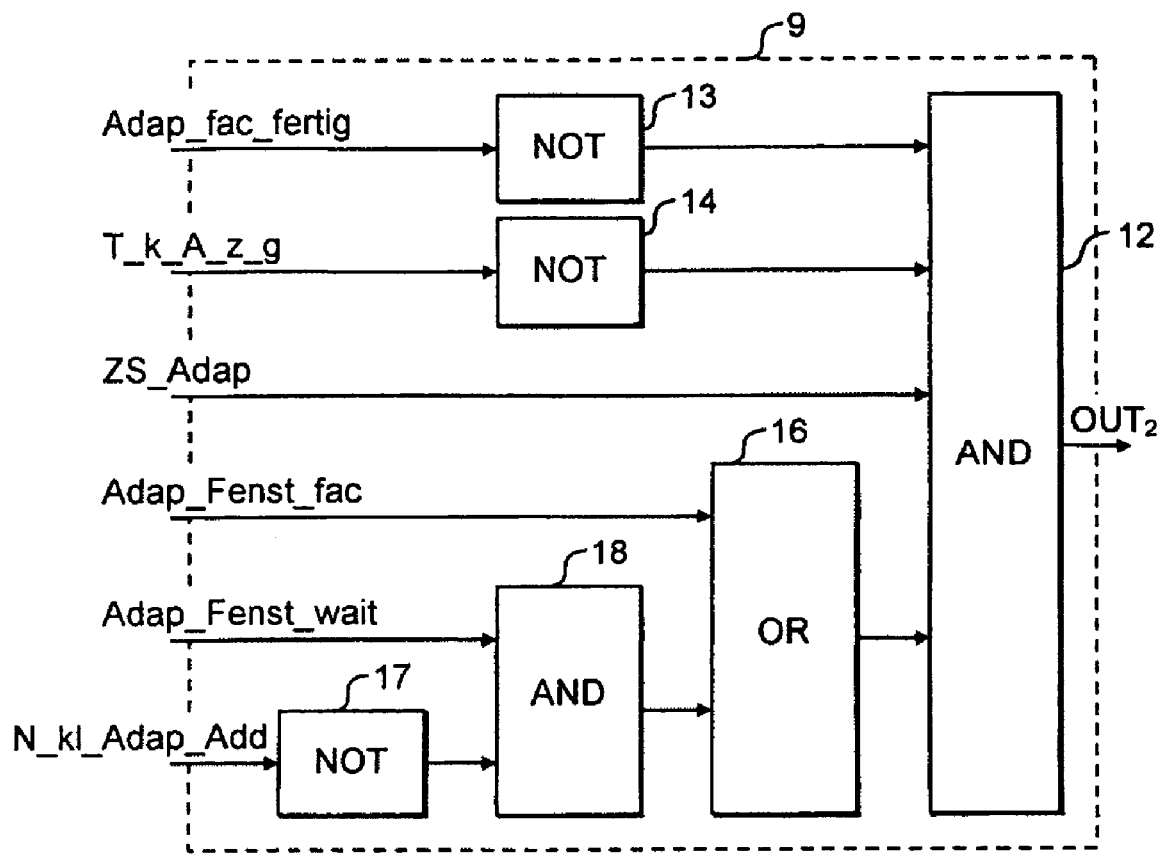
FIG. 3 shows an evaluation unit of the control unit from FIG. 1 for deactivating the lean mode for a factorial adaptation of the fuel/air ratio.

In order to disable the lean mode for a factorial adaptation mode, the control unit 1 has an evaluation unit 9, the structure of the evaluation unit 9 being illustrated in detail in FIG. 3, while the flowchart in FIG. 6b illustrates the method of operation of the evaluation unit 9.

Figure 4:
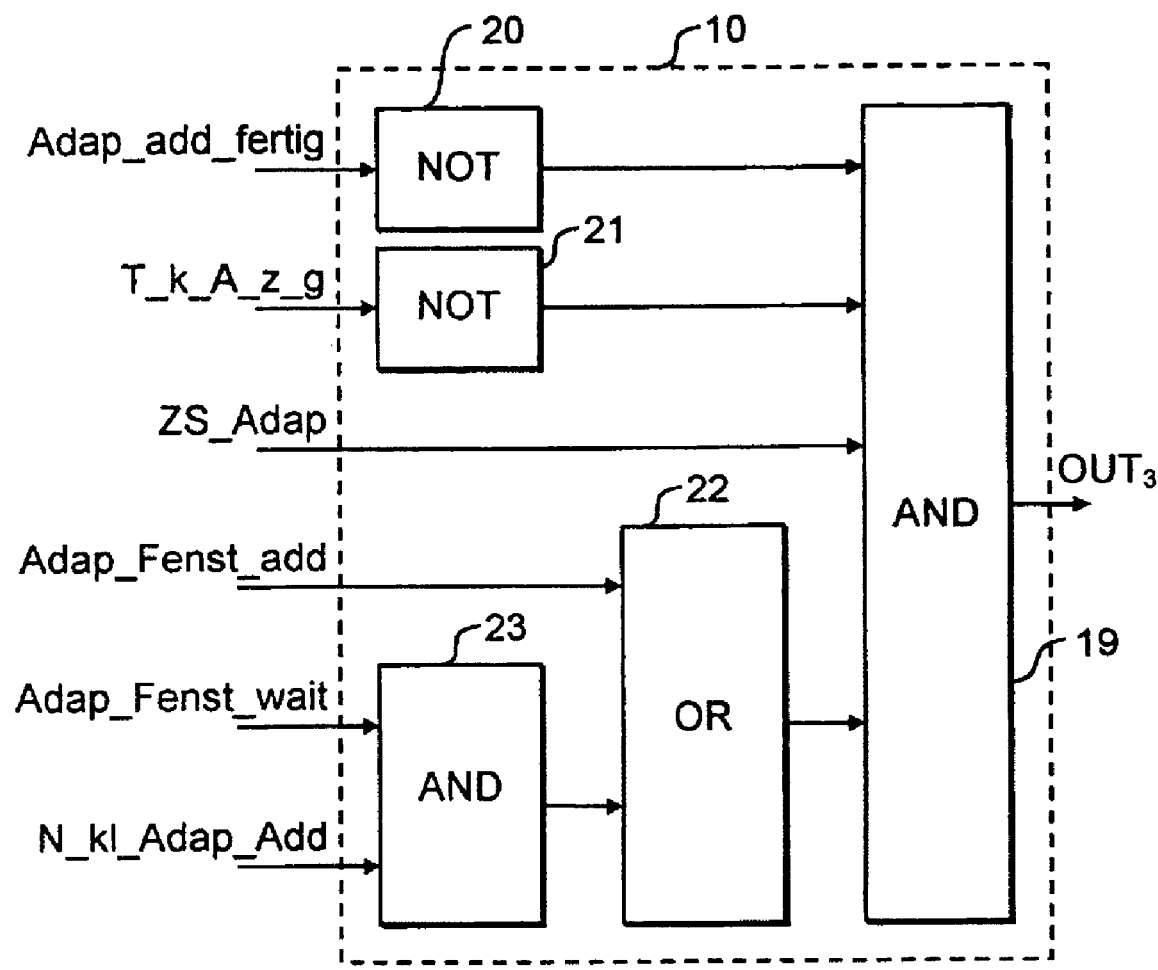
FIG. 4 shows an evaluation unit of the control unit from FIG. 1 for deactivating the lean mode for an additive adaptation of the fuel/air ratio.
Figure 6C:
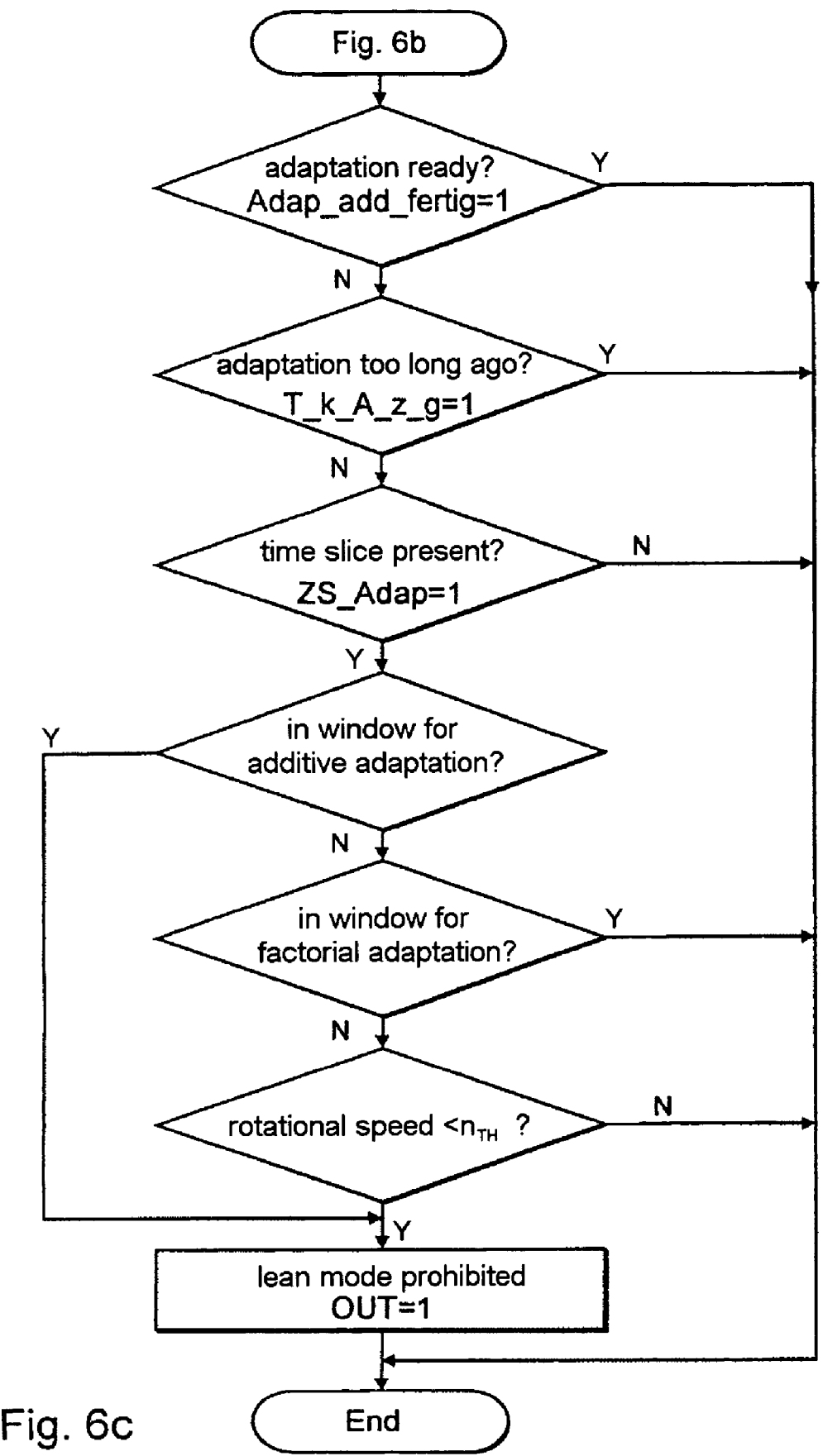

In order to disable the lean mode during the additive adaptation mode, the control unit 1 has a further evaluation unit 10, FIG. 4 showing the structure of the evaluation unit 10 in detail, while FIG. 6c illustrates the method of operation of the evaluation unit 10.

The two evaluation units 9, 10 are connected at the output end to the OR element 8 via an OR element 11 so that the control signal OUT assumes a high level at the signal output of the control unit 1 when there is an additive or factorial adaptation of the fuel/air ratio, as a result of which the lean mode is disabled.

The structure of the evaluation unit 9 will now be described below with reference to FIG. 3, the method of operation of the evaluation unit 9 also being explained with reference to the flowchart in FIG. 6b.

The evaluation unit 9 has a binary signal output at which a control signal $OUT_2$ is output as a function of the operating state of the spark ignition engine, the control signal $OUT_2$ assuming a high level to disable the lean mode, and a low level to enable the lean mode.

During the generation of the control signal $OUT_2$, the evaluation unit 9 takes into account a plurality of binary input signals which represent the operating state of the spark ignition engine, the various input signals being logically linked by means of an AND element 12, with the result that the lean mode is disabled for an adaptation of the fuel/air ratio only if a plurality of conditions are fulfilled.

In this context, an input signal Adap_fac_fertig indicates whether the factorial adaptation range of the fuel/air ratio is sufficiently adapted. If this is the case, the input signal Adap_fac_fertig assumes a high level which is transmitted to an input of the AND element 12 via an inverter 13, with the result that the lean mode is not disabled. In contrast, if the factorial adaptation range is not sufficiently adapted, the input signal Adap_fac_fertig assumes a low level, which is transmitted to an input of the AND element 12 via the inverter 13 as a high level, as a result of which the disabling of the lean mode for a factorial adaptation is enabled.

Furthermore, the evaluation unit 9 picks up a binary input signal T_k_A_z_g, which indicates, with a high level, that the time period since the last adaptation of the fuel/air ratio is too long. This is the case, for example, if the spark ignition engine has been operated only in the low load range for a relatively long time, with the result that, due to the load, no adaptation of the fuel/air ratio has taken place. In such a case, the lean mode is not to be disabled, with the result that the input signal T_k_A_z_g is fed to an input of the AND element 12 via an inverter 14. The lean mode can therefore be disabled for a factorial adaptation only if the time period since the last adaptation is not too long.

The control signal $OUT_2$ is generated by the evaluation unit 9 not only as a function of the operating state of the spark ignition engine but also in a timed fashion. The evaluation unit 9 therefore picks up, at the input end, a time slice signal ZS_Adap, which is supplied to an input of the AND element 12, and when there is a high level enables the disabling of the lean mode for an adaptation of the fuel/air ratio.

Figure 5:
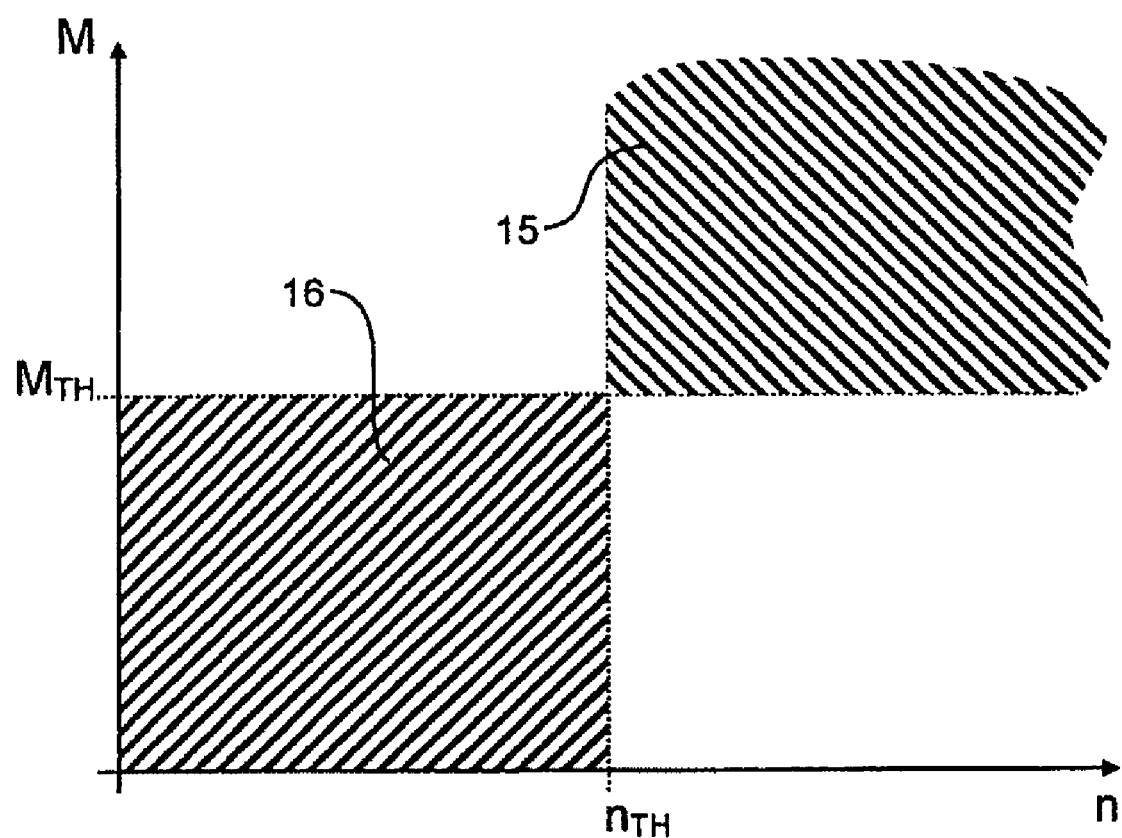
FIG. 5 shows a rotational speed/torque diagram with two rotational speed/torque windows for an additive or factorial adaptation.

Furthermore, the evaluation unit 9 picks up an input signal Adap_Fenst_fac which indicates, with a high level, that the rotational speed and torque of the spark ignition engine are within a load window 15, the load window 15 being illustrated in FIG. 5. The input signal Adap_Fenst_fac is fed to an input of the AND element 12 via an OR element 16, with the result that the disabling of the lean mode for a factorial adaptation is enabled if the rotational speed and torque of the spark ignition engine are within the load window 15.

However, the evaluation unit 9 permits the lean mode to be disabled for a factorial adaptation of the fuel/air ratio even if the rotational speed and torque of the spark ignition engine are outside the load window 15, if two conditions are fulfilled.

On the one hand, the rotational speed and torque must not be in a load window 16 which is provided for an additive adaptation of the fuel/air ratio. The evaluation unit 9 therefore picks up an input signal Adap_Fenst_wait, which indicates with a high level that the rotational speed and torque of the spark ignition engine are neither in the load window 15 nor in the load window 16.

On the other hand, the rotational speed of the spark ignition engine must be above a predefined limiting value in order to permit the lean mode to be disabled for a factorial adaptation, despite the operating point of the spark ignition engine which is outside the load window 15. The evaluation unit 9 therefore picks up an input signal N_kl_Adap_Add, which indicates with a high level that the rotational speed of the spark ignition engine drops below a predefined limiting value.

The input signal Adap_Fenst_wait, and the input signal N_kl_Adap_Add which is inverted by the inverter 18, are supplied to the OR element 16 via an AND element 18, with the result that the lean mode can be disabled even if the operating point of the spark ignition engine is outside the two load windows 15, 16 provided that the rotational speed of the spark ignition engine is above the limiting value.

The structure of the evaluation unit 10 will now be described below with reference to FIG. 4, the method of operation of the evaluation unit 10 also being explained with reference to the flowchart in FIG. 6c.

The evaluation unit 10 also has a binary signal output at which a control signal $OUT_3$ is output as a function of the operating state of the spark ignition engine, the control signal $OUT_3$ assuming a high level to disable the lean mode, and a low level to enable the lean mode.

During the generation of the control signal $OUT_3$, the evaluation unit 10 takes into account a plurality of binary input signals which represent the operating state of the spark ignition engine, the various input signals being logically linked by means of an AND element 19, with the result that the lean mode is disabled for an adaptation of the fuel/air ratio only if a plurality of conditions are fulfilled.

In this context, an input signal Adap_add_fertig indicates whether the additive adaptation range of the fuel/air ratio is sufficiently adapted. If this is the case, the input signal Adap_add_fertig assumes a high level which is transmitted to an input of the AND element 19 via an inverter 20, with the result that the lean mode is not disabled. In contrast, if the additive adaptation range is not sufficiently adapted, the input signal Adap_add_fertig assumes a low level, which is transmitted to an input of the AND element 19 via the inverter 20 as a high level, as a result of which the disabling of the lean mode for a factorial adaptation is enabled.

Furthermore, the evaluation unit 10 picks up the binary input signal T_k_A_z_g, which indicates, with a high level, that the time period since the last adaptation of the fuel/air ratio is too long. The input signal T_k_A_z_g is fed to an input of the AND element 19 via an inverter 21. The lean mode can therefore be disabled for an additive adaptation only if the time period since the last adaptation is not too long.

The control signal $OUT_3$ is generated by the evaluation unit 10 not only as a function of the operating state of the spark ignition engine but also in a timed fashion. The evaluation unit 10 therefore picks up, at the input end, the time slice signal ZS_Adap, which is supplied to an input of the AND element 19, and when there is a high level enables the disabling of the lean mode for an adaptation of the fuel/air ratio.

Furthermore, the evaluation unit 10 picks up an input signal Adap_Fenst_add which indicates, with a high level, that the rotational speed and torque of the spark ignition engine are within the load window 16. The input signal Adap_Fenst_add is fed to an input of the AND element 19 via an OR element 22, with the result that the disabling of the lean mode for an additive adaptation is enabled if the rotational speed and torque of the spark ignition engine are within the load window 16.

However, the evaluation unit 10 permits the lean mode to be disabled for a factorial adaptation of the fuel/air ratio even if the rotational speed and torque of the spark ignition engine are outside the load window 16, if two conditions are fulfilled.

On the one hand, the rotational speed and torque must not be in one of the load windows 15, 16. The evaluation unit 10 therefore picks up an input signal Adap_Fenst_wait, which indicates with a high level that the rotational speed and torque of the spark ignition engine are neither in the load window 15 nor in the load window 16.

On the other hand, the rotational speed of the spark ignition engine must be below a predefined limiting value in order to permit the lean mode to be disabled for an additive adaptation despite the operating point of the spark ignition engine which is outside the load window 16. The evaluation unit 10 therefore picks up the input signal N_kl_Adap_Add, which indicates with a high level that the rotational speed of the spark ignition engine drops below a predefined limiting value.

The input signal Adap_Fenst_Wait and the input signal N_kl_Adap_Add are supplied to the OR element 22 via an AND element 23, with the result that the lean mode can be disabled for an additive adaptation of the fuel/air ratio even if the operating point of the spark ignition engine is outside the two load windows 15, 16 provided that the rotational speed of the spark ignition engine is below the limiting frequency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and the equivalents thereof.

What is claimed:

1. An operating method for operating an engine controller for an internal combustion engine, comprising the steps:
   operating in a first operating mode,
   acquiring of at least one state variable of the internal combustion engine,
   changing over from the first operating mode into one of a second operating mode and a third operating mode,
   wherein the changing over takes place as a function of said at least one state variable of the internal combustion engine,
   wherein a fuel/air ratio of the internal combustion engine is adapted additively in the second operating mode or multiplicatively in the third operating mode, and
   wherein rotational speed and torque of the internal combustion engine are determined, and an additive or a multiplicative adaptation of the fuel/air ratio takes place as a function of the rotational speed and torque.

2. The operating method according to claim 1, wherein the internal combustion engine operates in lean mode in the first operating mode.

3. The operating method according to claim 1, wherein the multiplicative adaptation of the fuel/air ratio takes place if the torque exceeds a limiting value and the rotational speed exceeds a limiting value.

4. The operating method according to claim 1, wherein the additive adaptation of the fuel/air ratio takes place if the torque drops below a limiting value and the rotational speed drops below a limiting value.

5. The operating method according to claim 1, wherein fuel tank venting takes place in the second operating mode or in the third operating mode.

6. The operating method according to claim 5, wherein a degree of loading (CL) of a fuel tank filter is determined and compared with a predefined limiting value ($CL_{MAX}$), and wherein the changeover of the operating mode takes place if the determined degree of loading (CL) of the fuel tank filter exceeds the limiting value ($CL_{MAX}$) of the degree of loading.

7. The operating method according to claim 5, wherein a time period (T_CL) since a last fuel tank venting operation is determined, and wherein the changeover of the operating mode takes place if the time period ((T_CL) since the last fuel tank venting operation exceeds a predefined limiting value ($T\_CL_{MAX}$).

8. The operating method according to claim 7, wherein during the fuel tank venting operation, the degree of loading (CL) of the fuel tank filter is determined and the limiting value ($T\_CL_{MAX}$) for the time period (T_CL) since the last fuel tank venting operation is defined as a function of the determined degree of loading (CL).

9. An engine controller for an internal combustion engine, having at least a first signal input for acquiring at least one first state variable of the internal combustion engine, and a signal output for outputting a control signal for changing over the operating mode of the internal combustion engine, said controller comprising at least one evaluation unit for generating the control signal as a function of the at least one acquired state variable of the internal combustion engine, wherein said at least one first state variable represents at least one of a rotational speed and torque of the internal combustion engine, and an additive or a multiplicative adaptation of the fuel/air ratio takes place as a function of the rotational speed and torque.

10. The engine controller according to claim 9, wherein one of said at least one of first state variable represents the time period (T_CL) since the last tank venting operation.

11. The engine controller according to claim 9, wherein one of said at least one of first state variable represents the degree of loading (CL) of a fuel tank filter, and wherein the evaluation unit includes a comparator unit in order to compare the degree of loading (CL) with a predefined limiting value ($CL_{MAX}$) and to generate the control signal (OUT) as a function of the comparison.

12. The engine controller according to claim 9, wherein the evaluation unit includes a comparator unit in order to compare the time period (T_CL) since the last tank venting operation with a predefined limiting value ($T\_CL_{MAX}$) and to generate the control signal (OUT) as a function of the comparison.

13. The engine controller according to claim 13, wherein the evaluation unit includes a characteristic curve element in order to define the limiting value ($T\_CL_{MAX}$) for the time period (T_CL) since the last tank venting operation as a function of the degree of loading (CL) of the fuel tank filter.

14. The engine controller according to claim 10, wherein the evaluation unit is connected at the output end to a logic circuit.

15. An engine controller for an internal combustion engine, said controller comprising:

at least one evaluation unit having at least one signal input for receiving a corresponding at least one first state variable of the internal combustion engine and each of said at least one evaluation units providing a corresponding first output signal as a function of said at least one first state variable;

logic means responsive to said at least one first output signal of said evaluation unit in order to provide a first output control signal for changing an operating mode of the internal combustion engine; and additional evaluation units that disable a lean operating mode of the internal combustion engine when there is additive or multiplicative adaptation of the air/fuel mixture.

16. The engine controller according to claim 15, wherein one of said at least one evaluation units includes a first comparison for comparing a state variable representing the degree of loading with a pre-determined limiting value to generate a first preliminary control signal as a function of the comparison, said one evaluation unit further including a second comparison unit for comparing a timed period since a previous tank venting operation with a predefined limiting value to generate a second preliminary control signal as a function of the comparison.

17. The engine controller according to claim 16, wherein said first and second comparison units are connected to said logic means.

* * * * *